United States Patent [19]

Kalbach

[11] 4,339,779
[45] Jul. 13, 1982

[54] APPARATUS FOR PREVENTING DAMAGE BY VOLTAGE INTERRUPTION

[75] Inventor: John F. Kalbach, Altadena, Calif.

[73] Assignees: A.C. Manufacturing Company, Cherry Hill, N.J.; Computer Power Systems Corp., Carson, Calif.

[21] Appl. No.: 181,888

[22] Filed: Aug. 27, 1980

[51] Int. Cl.³ ............................................. H02H 7/08
[52] U.S. Cl. ........................................ 361/33; 307/68
[58] Field of Search .................. 307/47, 68; 364/707; 365/226–229; 361/33; 290/2; 322/4

[56] References Cited

U.S. PATENT DOCUMENTS

| | | | |
|---|---|---|---|
| 3,679,960 | 7/1972 | Hirokawa et al. | 322/4 |
| 3,866,442 | 2/1975 | Kouril et al. | 322/4 X |
| 4,203,041 | 5/1980 | Sachs | 307/68 X |

Primary Examiner—Harry E. Moose, Jr.
Attorney, Agent, or Firm—Robert K. Youtie

[57] ABSTRACT

Apparatus for use with an environmentally controlled electronic system to prevent damage by supply line voltage reduction in which an air conditioning motor is connected across the supply line to the electronic system, a device is connected in the supply line upstream of the motor connection for sensing power flow in a direction away from the electronic system when the supply line voltage is reduced and the motor operates as a generator, and a switch is interposed in the supply line between the motor connection and power supply which opens in response to reversed power flow to direct power from the motor operating as a generator to the electronic system.

5 Claims, 1 Drawing Figure

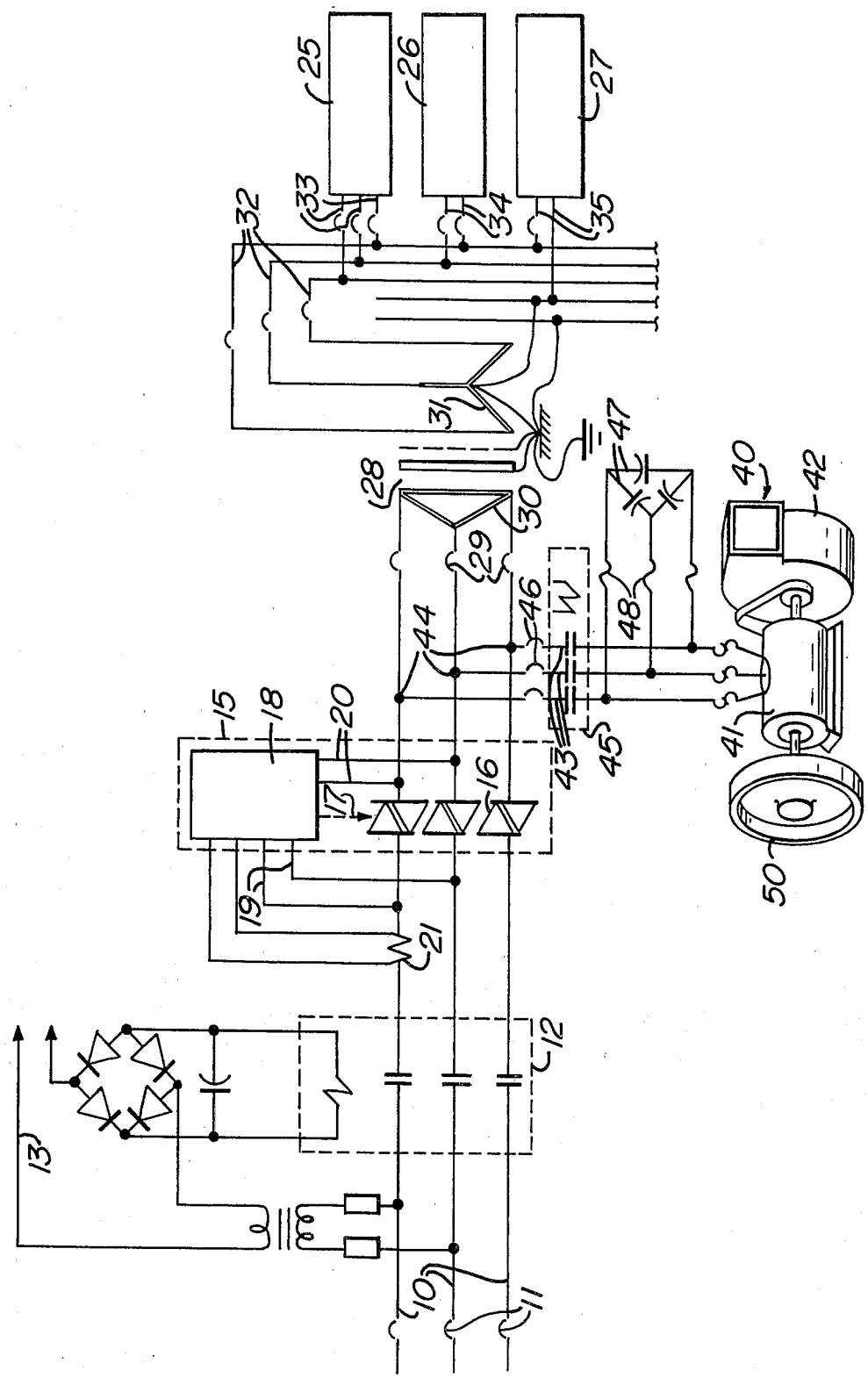

APPARATUS FOR PREVENTING DAMAGE BY VOLTAGE INTERRUPTION

BACKGROUND OF THE INVENTION

The problem of avoiding or minimizing power disturbances and interruptions to computer circuits and similar critical loads is not new. Several arrangements have, in the past, been proposed, including the use of surge arrestors, filters, isolating transformers, regulators, motor-generator sets and uninterrupted power supply systems. Such usage in the prior art has been found extremely expensive, and not always entirely satisfactory. Representative of the prior art are the below listed U.S. Pat. Nos.: 1,985,639 King, Jr., 2,922,896 Ohlund, 3,337,742 Baehr et al., 3,959,778 Brette.

SUMMARY OF THE INVENTION

It is an important object of the present invention to provide apparatus for the enhancement of power quality to an environmentally controlled computer, wherein a component of the system, namely an air handling motor, is connected across the power supply line to the computer, rather than being isolated from the computer supply line, and by its continuous rotation is utilized during momentary decrease or interruption of supply line voltage to operate as a generator and supply power to the electronic system.

It is a further object of the present invention to provide in the apparatus of the previous paragraph suitable switch means connected in the power supply line upstream of the motor connection for opening in response to supply voltage disturbance so that power from the air handling motor is necessarily directed to the electronic system.

It is a further object of the present invention to reduce the number and frequency of line disturbances and momentary interruptions which cause malfunctions of or damage to computer circuits. The majority of unwanted events caused by line disturbances will be a cause of performance problems such as slowing down the computer's through-put or interrupting its operation by creating parity errors, irrecoverable errors, hangs, halts or uncontrolled loops. These are usually the result of digital signal corruption which is created when line supply voltages are disturbed. Such disturbances are often of short duration, such that the practice of the present invention will provide ride-through of fractions of seconds to perhaps several seconds, depending upon the ratio of rotational energy stored to the rate of energy used by the load.

It is a more specific object of the present invention to provide in the apparatus set forth in the preceding paragraphs suitable means for sensing reverse power flow from the motor to the power supply source for opening the switch, and further sensing means for sensing amplitude and phase of voltages on opposite sides of the switch for properly closing the latter.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

The single FIGURE of the drawing is an electrical schematic illustrating the apparatus of the present invention in operative association with typical critical loads.

DESCRIPTION OF THE PREFERRED EMBODIMENT

Referring now more particularly to the drawings, a supply line is there generally designated 10, leading from a utility or other power source (not shown) and conventionally including main circuit breakers 11. A main contactor or power control 12 is connected in the supply line 10 downstream of the circuit breakers 11, and may conventionally include time delay drop-out means, as required by the system. Also, emergency power-off controls 13 may be associated with the main contactor 12.

Downstream of the main contactor 12, in the supply line 10 is an automatic power flow control, generally designated 15. This may include suitable line switching means 16, and switch operating means 17 connected between the switch means and controller proper 18. The controller proper 18 includes voltage sensing means, as connected by conductors 19 to the supply line 10 upstream of the switch 16 for sensing reverse power flow in the supply line 10, as toward the power source. Additional conductors 20 may connect between the sensing means of controller proper 18 and supply lines 10 downstream of switch 16, for cooperation with the conductors 19 to sense the voltage amplitudes and phases on opposite sides of the switch 16, for a purpose appearing presently.

A current transformer 21 may also be associated with the controller proper 18.

The system load or loads are shown as a computer 25, memory 26 and peripherals 27, all connected through suitable transformer means 28 at the downstream end of supply line 10. More specifically, just upstream of the transformer 28 the supply line may be provided with primary circuit breakers or fuses 29, while the transformer may include primary and secondary sides 30 and 31, respectively. From the transformer secondary 31, there may extend supply lines 32 for connection, as by conductors 33 to the computer 25, conductors 34 to the memory, and conductors 35 to the peripherals. The provision of suitable circuit breakers or fuses is preferred.

An air handling system 40 may include a motor 41 in driving relation with a fan or blower 42. Motor supply conductors 43 extend to connections at 44 with the supply line 20 at a location between the power flow control 15 and the transformer 28. Thus, the motor 41 is connected to the supply line 10 on the downstream side of the switch 16.

The motor 41 of the air handler 40 may be provided in conductors 43 with a suitable starter 45 and circuit breakers or fuses 46 may be interposed in the conductor 43 between the starter 45 and the connections 44.

Capacitors 47 may advantageously be connected in parallel with the terminals of motor 41 across the connector lines 43 to improve the power factor, for a purpose appearing presently. The capacitors 47 are preferably fused, as at 48.

In operation, in the event of a momentary voltage disturbance in supply line 10, say a voltage interruption, the momentum or inertia of the rotating motor 41 and its rotating load 42 would drive the motor as a generator to cause reverse power flow into the supply line 10 toward the utility or power source. This reverse power flow through closed switch 16 is sensed, as through conductors 19 by controller 18, which actuates switch operator 17 to open the switch 16. Thus, power flow from the motor 41 operating as a generator is constrained to flow in the supply line 10 rightward, for maintaining satisfactory voltage to the electronic load 25–27. The parallel connected capacitors 47 maintain the power factor close to unity to assure maintenance of satisfactory voltage generated by the motor 41 for power flow to the load 25–27.

Upon return of adequate supply voltage from the utility or other power source in supply line 10, this voltage is compared with the voltage generated by motor 41, as through conductors 19 and 20 on opposite sides of the open switch 16, the sensing and comparison of voltage amplitudes and phases being controlled by controller 18 which, upon satisfactory voltage comparison actuates switch operator 17 to close the switch 16.

The controller 18 may be a fast drop-out a-c contactor in most applications, although a solid state power switch, such as a gate controlled a-c switch may be more quickly effective, if that is desired.

In addition to the rotational inertia of the motor 41 and blower 42, there may be provided a flywheel 50, also driven by the motor 41 if greater inertia is believed necessary.

While a-c motors inherently operate as generators when mechanically driven under an electric load, it is advantageous in the instant invention to utilize induction motors of large radii of gyration and low slip, for increased rotational inertia and better frequency of voltage generated by the motor. However, other motors may be employed, including synchronous and hysteresis-synchronous motors. Additionally d-c motors may be employed with suitable convertors.

From the foregoing, it is seen that the present invention provides apparatus for preventing malfunction and possible damage by momentary supply line voltage reduction to an electronic system, which apparatus is extremely simple in construction and reliable in operation, durable throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Apparatus for preventing malfunction or damage by momentary supply line voltage reduction to an environmentally controlled electronic system having a blower motor; said apparatus comprising motor connection means for connecting the motor across the supply line, power direction sensing means in the supply line upstream of the motor connection means for sensing reverse power flow in the line when the supply line voltage is reduced and the motor operates as a generator, switch means for location in the supply line between the power supply and motor connection means, switch opening means connected between said power direction sensing means and the switch means to open the latter responsive to said reversed power flow, to thereby direct power from the motor operating as a generator to the electronic system, and voltage sensing means for sensing voltages in the supply line on opposite sides of said switch means, and switch closing means connected between said voltage sensing means and switch means to close the latter responsive to resumption of line voltage from the power supply acceptable in phase with voltage from the motor operating as a generator.

2. Apparatus according to claim 1, said electronic system comprising a computer, an air conditioning system for said computer, said air conditioning system including said blower motor, and a flywheel associated with said motor, for minimizing discontinuity of power flow to said system.

3. Apparatus according to claim 1, in combination with capacitance connected in parallel with the motor terminals to maintain output voltage of said motor when operating as a generator.

4. Apparatus according to claim 1, said switch means comprising a fast drop-out a-c contactor.

5. Apparatus according to claim 1, said switch means comprising a gate controlled a-c switch.

* * * * *